(12) United States Patent
Cooper et al.

(10) Patent No.: US 6,754,904 B1
(45) Date of Patent: Jun. 22, 2004

(54) INFORMING NETWORK USERS OF TELEVISION PROGRAMMING VIEWED BY OTHER NETWORK USERS

(75) Inventors: Robert M. Cooper, Vienna, VA (US); Laurence F. Kirsh, Herndon, VA (US); Carlos A. Silva, Jr., Potomac, MD (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/475,905

(22) Filed: Dec. 30, 1999

(51) Int. Cl.[7] .............................................. H04N 7/025
(52) U.S. Cl. .................... 725/32; 709/204; 709/206; 345/758; 345/753
(58) Field of Search ........................... 725/32; 709/206, 709/204; 345/751–759; 370/260

(56) References Cited

U.S. PATENT DOCUMENTS

| | | | |
|---|---|---|---|
| 5,589,892 A | | 12/1996 | Knee et al. |
| 5,694,163 A | * | 12/1997 | Harrison ...................... 725/110 |
| 5,764,916 A | * | 6/1998 | Busey et al. ................. 709/227 |
| 5,774,664 A | | 6/1998 | Hidary et al. |
| 5,790,793 A | | 8/1998 | Higley |
| 5,793,365 A | | 8/1998 | Tang et al. |
| 5,828,839 A | | 10/1998 | Moncreiff |
| 5,920,692 A | | 7/1999 | Nguyen et al. |
| 5,961,603 A | | 10/1999 | Kunkel et al. |
| 5,969,748 A | | 10/1999 | Casement et al. |
| 5,990,887 A | * | 11/1999 | Redpath et al. ............. 345/758 |
| 5,990,927 A | | 11/1999 | Hendricks et al. |
| 5,999,970 A | * | 12/1999 | Krisbergh et al. .......... 725/109 |
| 6,002,394 A | | 12/1999 | Schein et al. |
| 6,018,768 A | * | 1/2000 | Ullman et al. .............. 709/218 |
| 6,025,837 A | * | 2/2000 | Matthews et al. .......... 345/721 |
| 6,049,823 A | * | 4/2000 | Hwang ......................... 725/82 |
| 6,081,830 A | * | 6/2000 | Schindler .................... 709/204 |
| 6,163,316 A | * | 12/2000 | Killian ........................ 345/721 |
| 6,172,677 B1 | * | 1/2001 | Stautner et al. ............. 345/716 |
| 6,205,485 B1 | * | 3/2001 | Kikinis ....................... 709/231 |
| 6,212,548 B1 | | 4/2001 | DeSimone et al. |
| 6,339,842 B1 | * | 1/2002 | Fernandez et al. .......... 725/133 |
| 6,341,306 B1 | | 1/2002 | Rosenschein et al. |
| 6,360,254 B1 | | 3/2002 | Linden et al. |
| 6,392,664 B1 | | 5/2002 | White et al. |
| 6,425,012 B1 | * | 7/2002 | Trovato et al. ............. 709/227 |
| 6,442,590 B1 | | 8/2002 | Inala et al. |
| 6,519,771 B1 | | 2/2003 | Zenith |
| 6,525,747 B1 | * | 2/2003 | Bezos ......................... 345/751 |
| 2001/0011293 A1 | | 8/2001 | Murakami et al. |
| 2002/0010742 A1 | | 1/2002 | Kihara et al. |
| 2002/0073154 A1 | | 6/2002 | Murakami et al. |
| 2002/0174234 A1 | | 11/2002 | Trovato et al. |

FOREIGN PATENT DOCUMENTS

| | | | |
|---|---|---|---|
| EP | 0851681 A1 | 7/1998 | .......... H04N/7/173 |
| EP | 0 854 645 | 7/1998 | |
| JP | 11-110394 | 4/1999 | |
| JP | 11-143891 | 5/1999 | |
| JP | 11-308549 | 5/1999 | |
| WO | WO 97/41690 | 11/1997 | .......... H04N/7/16 |
| WO | WO 98/17064 | 4/1998 | .......... H04N/7/173 |
| WO | WO 98/31114 | 7/1998 | .......... H04H/9/00 |
| WO | WO 01/10128 | 2/2001 | |

OTHER PUBLICATIONS

WebTV FAQs, http:/www.webtv.net/products/faqs_main.html, Mar. 31, 1999.

Intel Intercast Tools: Next Generation Content Management Software for Interactive TV Programming, 1998.

* cited by examiner

Primary Examiner—Vivek Srivastava
Assistant Examiner—Jason J. Chung
(74) Attorney, Agent, or Firm—Fish & Richardson P.C.

(57) ABSTRACT

A method of informing a first network user of activity by other network users includes receiving information identifying television programming viewed by at least one other network user and displaying the information to the first network user on a user interface.

25 Claims, 12 Drawing Sheets

INFORMING NETWORK USERS OF TELEVISION PROGRAMMING VIEWED BY OTHER NETWORK USERS

TECHNICAL FIELD

This invention relates to selecting a television channel.

BACKGROUND

Figure 1:
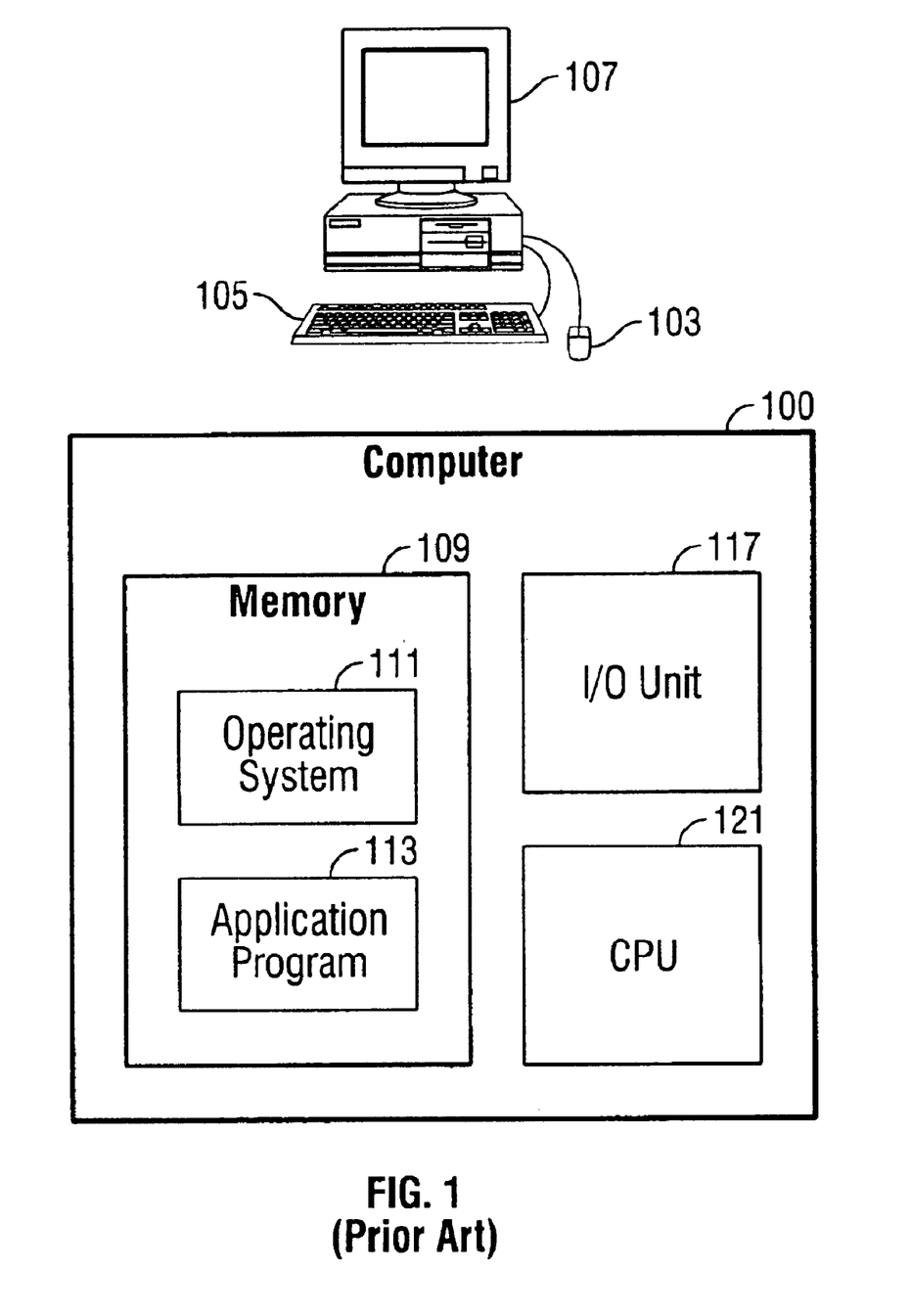
FIG. 1 is a block diagram of a computer system.

The computer system illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113.

Figure 2:
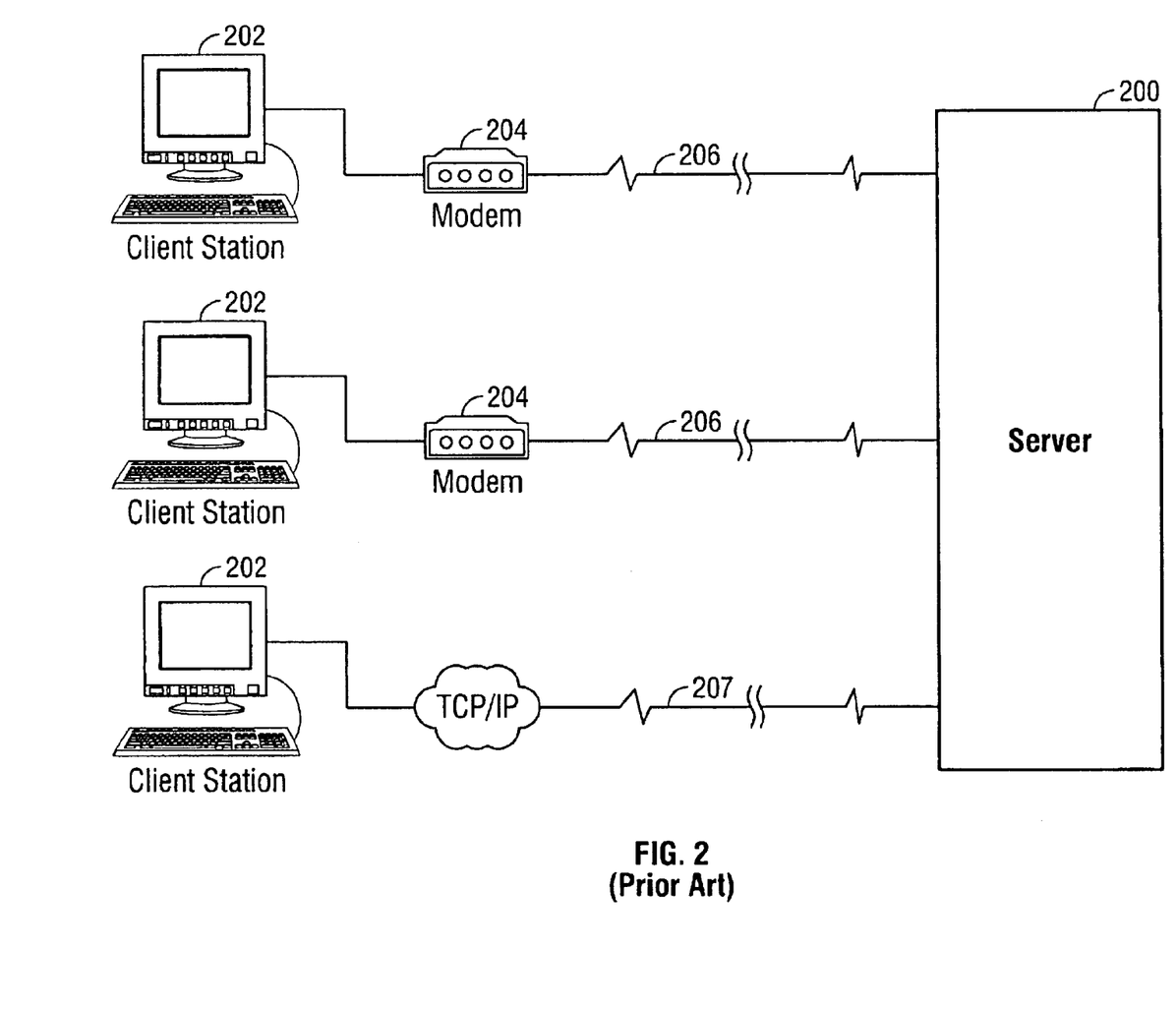
FIG. 2 shows a typical network computing environment.

As shown in FIG. 2, a user of a computer system can access electronic content or other resources either stored locally at the user's own client system 202 (e.g., a personal or laptop computer) or remotely at one or more server systems 200. An example of a server system is a host computer that provides subscribers with online computer services such as e-mail and Internet access. Users of a host computer's online services typically communicate with one or more central server systems 200 through client software executing on their respective client systems 202.

In practice, a server system 200 typically will not be a single monolithic entity but rather will be a network of interconnected server computers, possibly physically dispersed from each other, each dedicated to its own set of duties and/or to a particular geographical region. In such a case, the individual servers are interconnected by a network of communication links, in known fashion. One such server system is "America Online 4.0" from America Online, Incorporated of Virginia.

Figure 3:
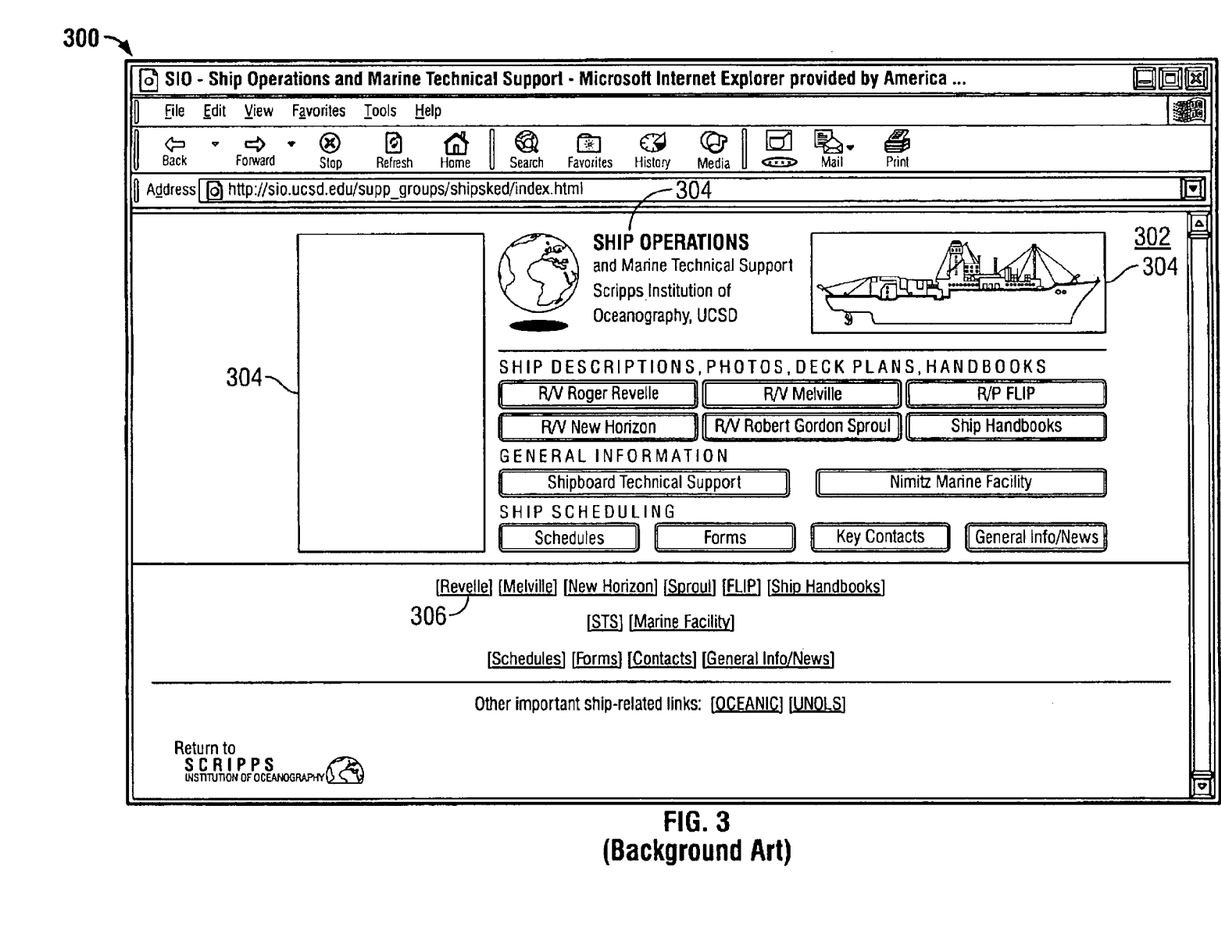
FIG. 3 shows a screen shot of a browser displaying a webpage.

FIG. 3 is a screen shot of a "browser" application 300 (Internet Explorer) displaying a typical HTML document, or web page 302. A "browser" is an example of client software that enables users to access and view electronic content stored either locally or remotely, such as in a network environment (local area network (LAN), intranet, Internet). A browser typically is used for displaying documents described in Hyper-Text Markup Language (HTML) and stored on servers connected to a network such as the Internet.

A user instructs a browser to access an HTML document, or web page, by specifying a network address—or Uniform Resource Locator (URL)—at which a desired document resides. In response, the browser contacts the corresponding server hosting the requested web page, retrieves the one or more files that make up the web page, and then displays the web page in a window on the user's computer screen.

As shown in FIG. 3, a single web page may be composed of several different files potentially of different data types 304 (e.g., text, images, virtual worlds, sounds, movies, etc.). In addition, a web page can includes links 306, or pointers, to other resources (e.g., web pages or individual files) available on the network. Each link has an associated URL pointing to a location on the network. When a user clicks on, or otherwise selects a displayed link, the browser automatically will retrieve the web page corresponding to the link's associated URL and display it to the user.

Figure 4:
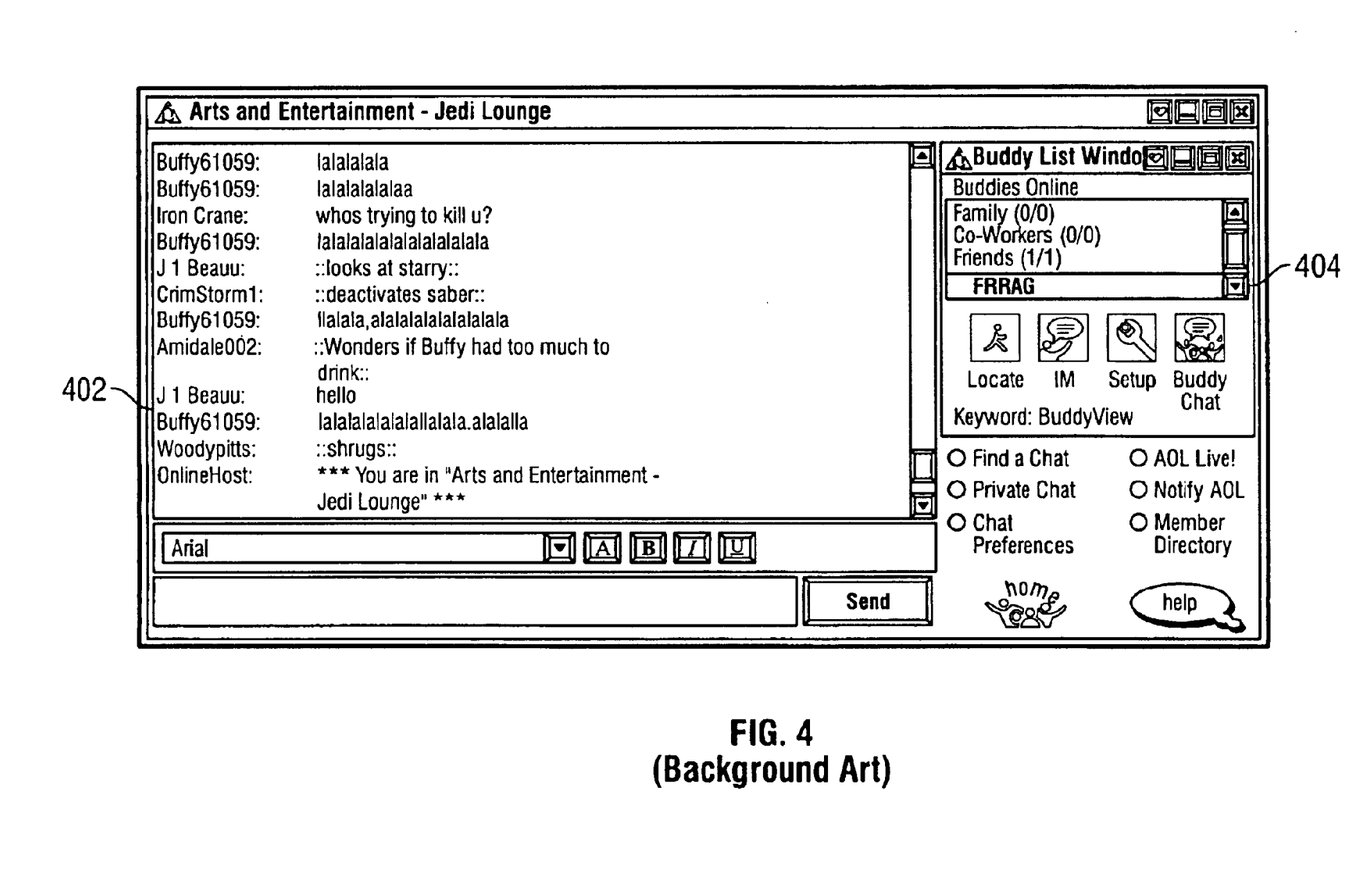
FIG. 4 shows a screen shot of a chat room.

As shown in FIG. 4, some server systems offer chat rooms that display user messages in real time. Client chat room software (e.g., America Online 4.0 and Internet Relay Chat) depicts a text window 402 that displays each message submitted by users visiting the chat room. The client software also provides controls for entering a message and submitting the entered messages to the server system. The server system broadcasts each submitted message to the other chat room users for display on their respective text windows 402. Typically, chat rooms are named for discussion topics to help users to find chat rooms of interest.

FIG. 4 also shows a list of users 404 known as a "buddy list". A user creates a buddy list by entering the names of other server system users (e.g., friends, family, or co-workers). The server can notify the user when the users in the buddy list log-on to the server system. The server can also provide other information such as which chat room the user is currently visiting.

Recently, a special purpose computer referred to as a "set-top box" has been developed and used in connection with standard television (TV) sets for viewing web pages on the Internet. The term set-top box derives from the usual placement of the device on top of a television. The term, however, should not be construed literally. That is, a set-top box may neither be a box nor be placed on top of a display. A set-top box essentially has the same basic components as the general purpose computer illustrated in FIG. 1, except that it also includes a TV tuner for receiving broadcast and/or cable TV signals. Users of such "web TV" systems can make dual usage of their TV sets—that is, either to watch TV or to view web pages and otherwise "surf" the Internet.

SUMMARY

Various implementations of the invention may include one or more of the following features.

In general, in one aspect, the invention features a method of informing a first network user of activity by other network users. The method includes receiving information identifying television programming viewed by at least one other network user and displaying the information to the first network user on a user interface.

Embodiments may include one or more of the following. The information may be received via the Internet, for example, by a set-top box having an Internet connection. The user interface may also display television programming (e.g., a TV show). The method may further include transmitting a message requesting the information from a server. Displaying the information may include displaying a link that automatically tunes the set-top box to television programming identified by the link. The method may also include maintaining a list (e.g., a buddy list) of network users associated with the first user.

In general, in another aspect, the invention features a method of informing a first network user of activity by other network users. The method includes maintaining a list of network users associated with the first user, receiving information from one or more of the other users that corresponds to the television programming viewed by the other network user(s), and transmitting information describing the television programming viewed by the other network user(s) to the first network user.

Embodiments may include one or more of the following features. The information may be received by an Internet service provider. The list may be received from a client.

In general, in one aspect, the invention features a computer program, disposed on a computer readable medium, for informing a first network user of activity by other network users. The computer program includes instructions for causing a processor to receive information identifying television programming viewed by at least one other network user, and display the information on a user interface.

In general, in one aspect, the invention features a computer program, disposed on a computer readable medium, for informing a first network user of activity by other network users. The program includes instructions for causing a processor to maintain a list of network users associated with the first user, receive information from one or more of the other users that corresponds to the television programming viewed by the other network user(s), and transmit information describing the television programming viewed by the other network user(s) to the first network user.

The details of one or more embodiments are set forth in the accompanying drawings and the description below. Other features, objects, and advantages of the invention will be apparent from the description and drawings, and from the claims.

DRAWING DESCRIPTIONS

Like reference numbers and designations in the various drawings indicate like elements.

DETAILED DESCRIPTION
The Set-Top Device

Figure 5:
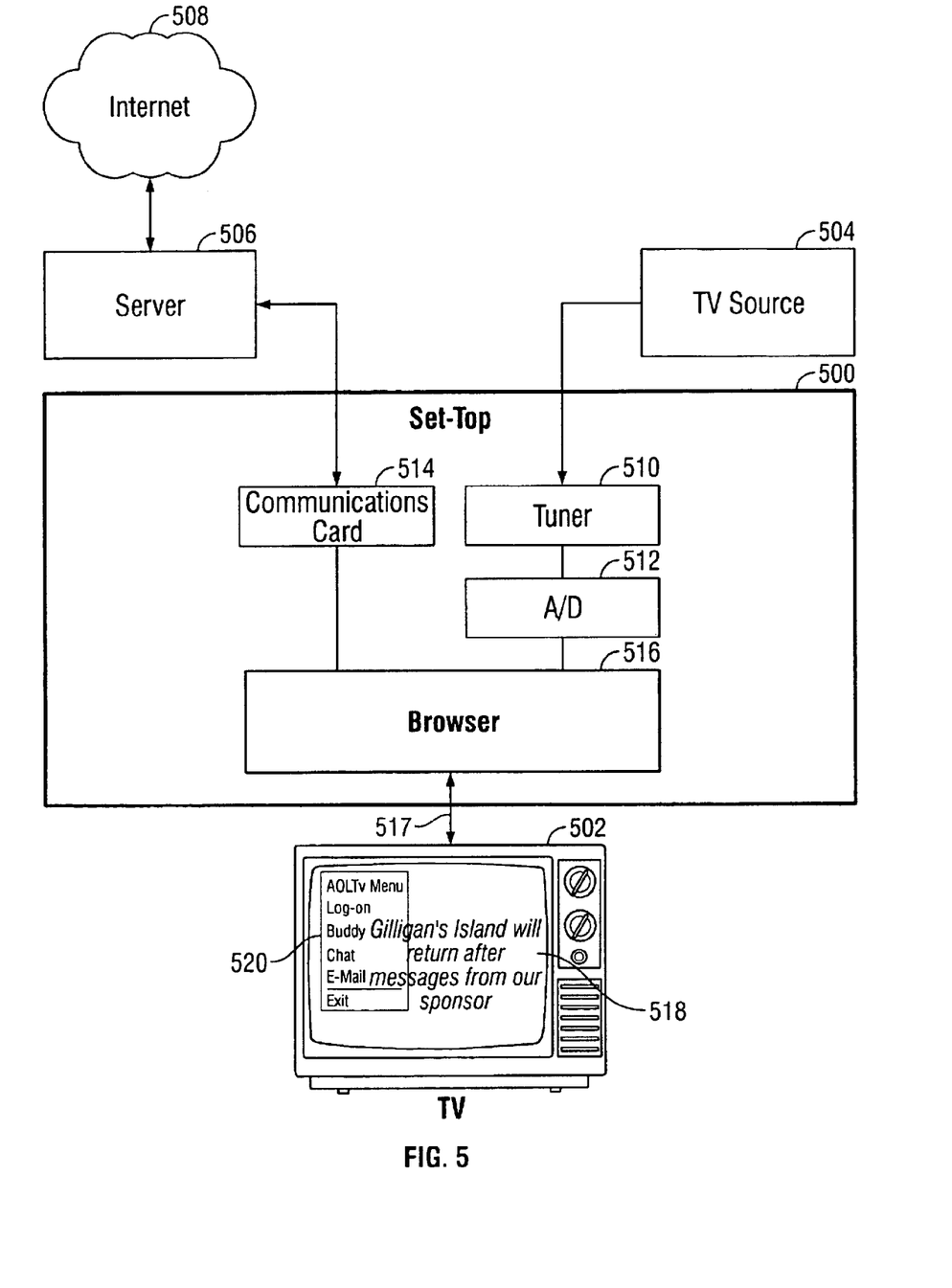
FIG. 5 is a block diagram of a set-top box.

FIG. 5 shows a set-top box 500. The set-top box 500 receives TV signals from a TV source 504 such as a cable, satellite, or conventional TV provider. The box 500 includes a tuner 510 to select a TV channel for viewing. The selected TV channel may be digital in the case of a satellite TV source or analog in the case of most cable TV sources. The box 500 can include an analog-to-digital converter 512 to permit digital processing of the TV images regardless of the TV source.

The box 500 includes a network communication card 514 to communicate with a network server 506 such as an ISP (Internet Service Provider). The box 500 also includes browser client software 516 for communicating with the server, for example, by sending and receiving HTTP (HyperText Transfer Protocol) messages. Additionally, the box 500 includes communication protocol software (e.g., TCP/IP) and an operating system.

The box 500 constructs a display that can include information received from the server 506 and/or from the TV source 504. The box 500 sends the constructed display to a TV 502 or monitor via an output port 517. In one embodiment, the browser 516 (e.g., Liberate's TV Navigator) integrates server and TV information by processing an HTML-like (HyperText Manipulation Language) tag (e.g. <IMG SRC="TV" x=0 y=0>) that instructs the browser 516 to place incoming TV images on the screen at specified coordinates. By modifying a received web-page to include this tag, the browser 516 can display the TV data received from the TV source 504 in conjunction with information provided by the server 506. Alterations to the screen, such as adding user interface controls or moving and/or resizing the TV image also can be performed by altering instructions of a web-page displayed by the browser. The box 500 may store a default web-page that makes the received TV signal a full-screen background image 518 with overlayed user interface controls 520. The controls 520 can correspond to functions such as initiating a session with the server 506.

Tuning Links

Figure 6:
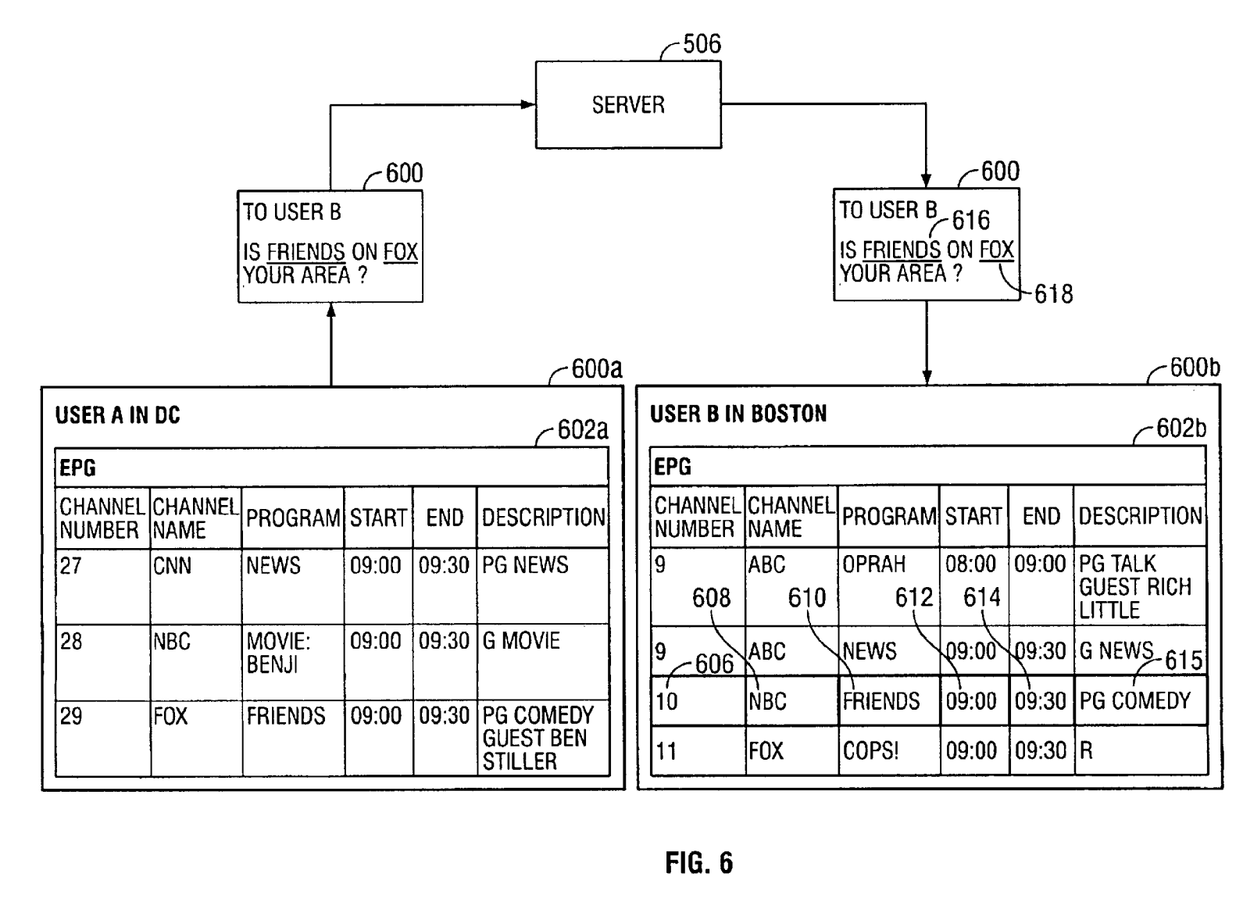
FIG. 6 is a flow diagram illustrating transmission of a message including links that select a television channel.

FIG. 6 shows a set-top box 600a in Washington, D.C. sending a message 600 to a set-top box 600b in Boston via the server 506. The message 600 could be part of an e-mail message, a chat room entry, an instant message, etc. The message includes links 616 and 618 that can control the tuner of a set-top box. Each link 616 and 618 can include a reference to a television channel feature (e.g., "<A TVREF= FOX>") and instructions for displaying the link on a display (e.g., "<UNDERLINE>FOX</UNDERLINE>"). Like conventional links, the links 616 and 618, may by represented by one or more graphic images instead of simple text. For example, the links 616 and 618, may appear as a web banner, for example, advertising a TV show that is displayed when a user visits a URL.

Unlike traditional links that cause a browser to load specified files or an Internet URL (Universal Resource Locator) when selected, the links 616 and 618 in the message 600 can change the channel of the set-top box. This enables friends to exchange messages that include links to a particular network 618 or TV show 616. When selected, the browser tunes the set-top box to the channel corresponding to the network or show specified by a link.

The link may, but need not, refer to a specific channel (e.g., "Jim, turn to channel 38"). In fact, referring to a specific channel may be undesirable as different geographic locations may offer a given TV network on different channels. For example, an NBC affiliate in Boston may be on channel "10" while the D.C. NBC affiliate broadcasts on channel "28". Additionally, channel numbers may vary based on the TV source. That is, the D.C. NBC affiliate may broadcast in the frequency band for channel "28" but may be programmed and presented to viewers as channel "4" by a D.C. cable TV company. Thus, providing a link that references a network instead of a particular channel increases the likelihood the link will appropriately change the channel when transmitted to users that receive TV signals from different sources.

However, merely specifying a network may also be undesirable because TV schedules typically vary from location to location. For example, an NBC TV network affiliate in Boston may broadcast a movie while the NBC TV network affiliate in Washington D.C. broadcasts a talk show. Further, the same show may be shown by different networks in different locations. That is, in some areas a show may appear on the ABC television network while in other locations the same show is broadcast by FOX networks. Finally, a given show may be broadcast at different times in different time zones. To account for these variations, set-top software (e.g., extensions to the browser) can determine a channel corresponding to a link based on a wide variety of channel features instead of the channel number or network name, for example, by using an electronic programming guide (EPG).

As shown in FIG. 6, the set-top boxes 600A, 600B have received different EPGs 602A, 602B. An EPG is essentially an electronic version of a TV guide. Different EPGs can include different information. For example, an EPG can include a show title 610, channel number 606, network 608, and start 612 and stop 614 times of different TV programs. The EPG also can include other data 615 such as ratings (e.g., "R" and "PG-13") and/or a brief description of the show such as its type (e.g., "sitcom" or "drama") and/or actors that appear in the show. In one embodiment, broadcasters transmit EPG guides to set-top boxes using the vertical blanking interval (VBI) of traditional video signals. Typically, information included in the VBI does not affect the image displayed on a TV. Thus, the VBI provides a convenient buffer for unobtrusively transmitting information to set-top boxes 600A, 600B. In other embodiments, the set-top boxes 600A, 600B can receive an EPG from the server 506 based on the billing address of the set-top box user or a local server access phone number dialed by the set-top box. In yet other embodiments, the EPG may be transmitted by satellite.

A set-top box 600B can use the EPG information to select a channel corresponding to a particular link from the shows currently available from the TV source. For example, in FIG. 6, the set-top box 600B in Boston has received message including a link 616 referring to the TV show "Friends" from a user in D.C. Looking up the show "Friends" in the "program" column of the Boston set-top box's 600B EPG 602B yields a tuning channel of "10".

The message also includes a link 618 referring to the FOX network. Selection of this link and the ensuing lookup of "FOX" in the "channel name" column of the EPG 602B tunes the Boston set-top box 600B to channel "11".

In general, the links can refer to any information included in the EPG such as actors or actresses appearing in shows (e.g., "Meryl Streep is a very good actress").

Software can examine each column of the EPG until a match (or a near match) is found and can change the channel correspondingly. In this example, the set-top box would search for a show starring Meryl Streep, and, if found, would tune the TV to channel for that show.

Figure 7:
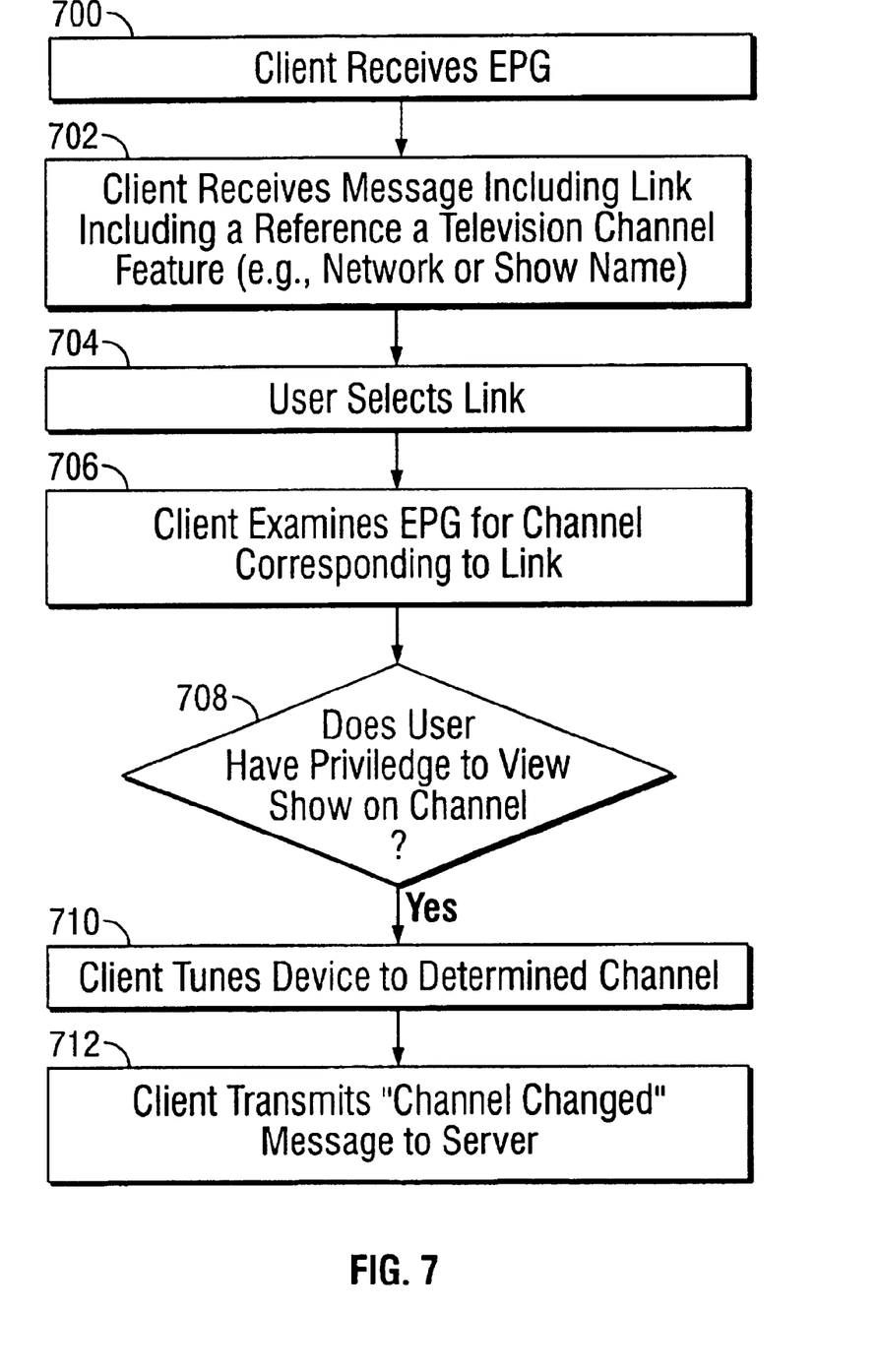
FIG. 7 is a flow chart of a process for tuning a set-top box in response to user selection of a link.

FIG. 7 shows a process for tuning the set-top system based on a received link. After receiving an EPG 700. The client receives a message including a link that is a reference to a television channel feature (e.g., a network or a show) 702, user selection of a link 704 causes set-top box software to determine tuning information corresponding to the link 706, for example, by looking-up the information in an EPG. The software tunes 710 the set-top box to the determined tuning channel.

In some embodiments, the process may enforce parental controls 708 over the type of programming different family members can view. For example, America Online enables a parent to create user names for family members and associate different privileges to each of the user names. For example, a parent can configure the family member accounts such that a child has privilege only to see TV programs having a "G" (General) rating while a teenager has privileges to see TV programs having a "G" or "PG" (Parental Guidance suggested) rating.

Potentially, a given show will not be immediately available when a user selects a link. For example, a user may select a TV show's link included an e-mail message written much earlier in the day. In this case, a lookup for the show in the current time period would fail. The set-top box, however, can store the link and remind a user and/or automatically tune the set-top box when the linked TV show is scheduled for broadcast.

In some embodiments, the set-top box transmits 712 a message to the server whenever a user changes channels. This enables the server to track viewers and supports features such as TV buddy lists and TV chat rooms.

TV Chat Rooms

Figure 9:
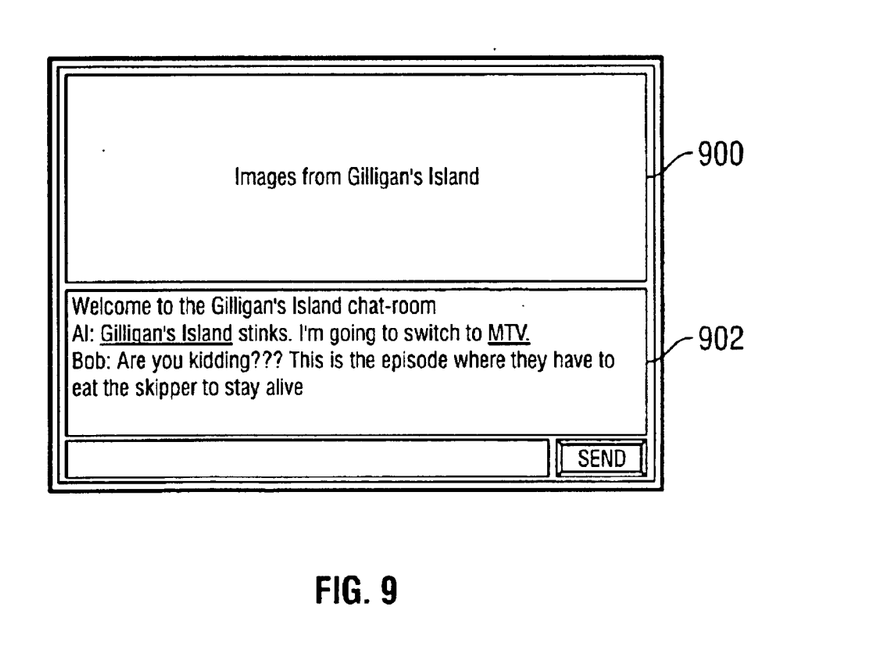
FIG. 9 shows a diagram of a screen display of chat room for a displayed TV show.

The display shown in FIG. 9 illustrates how a display can simultaneously present a television program and a chat room. The television program and chat room may be independent. That is, a user could change TV shows without changing chat rooms and vice-versa.

Figure 8:
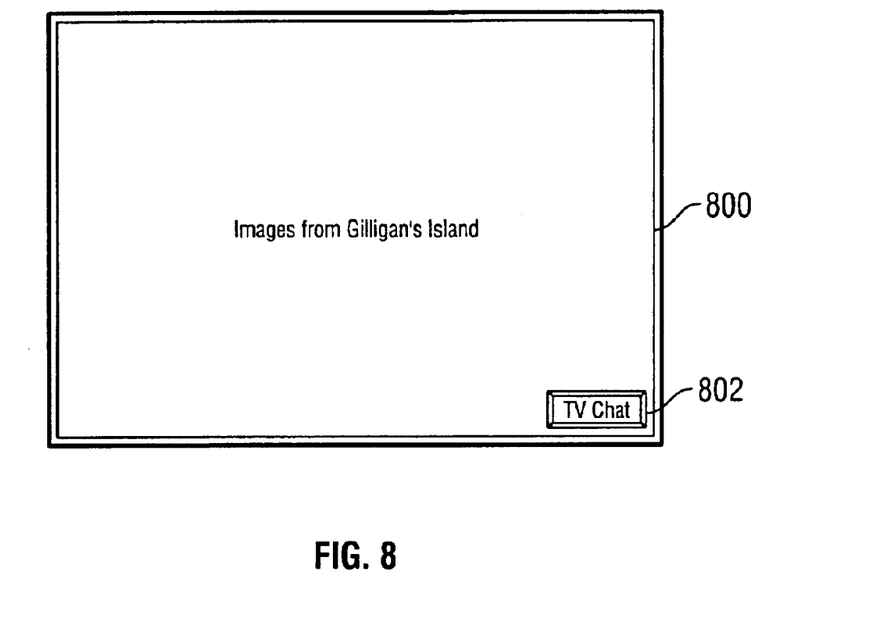
FIG. 8 shows a diagram of a screen display including a chat control.

In other embodiments, software may control the chat room the user is a member of so that it corresponds to the viewed television program. For example, as shown in FIG. 8, a display may include a region for displaying a received TV signal 800 (e.g., Gilligan's Island) and a "TV chat" control 802. Selecting the control automatically places a user in a chat room corresponding to the particular TV show. As shown in FIG. 9, when a user watching "Gilligan's Island" selects the TV chat control, the server places the user in a "Gilligan's Island" chat room 902 with other users viewing the show. The users can then share their comments on the show in real time by submitting messages to the server for display in the chat room window. The browser can configure the display such that the chat room text window 902 and the TV show display 900 can be viewed simultaneously.

Figure 10:
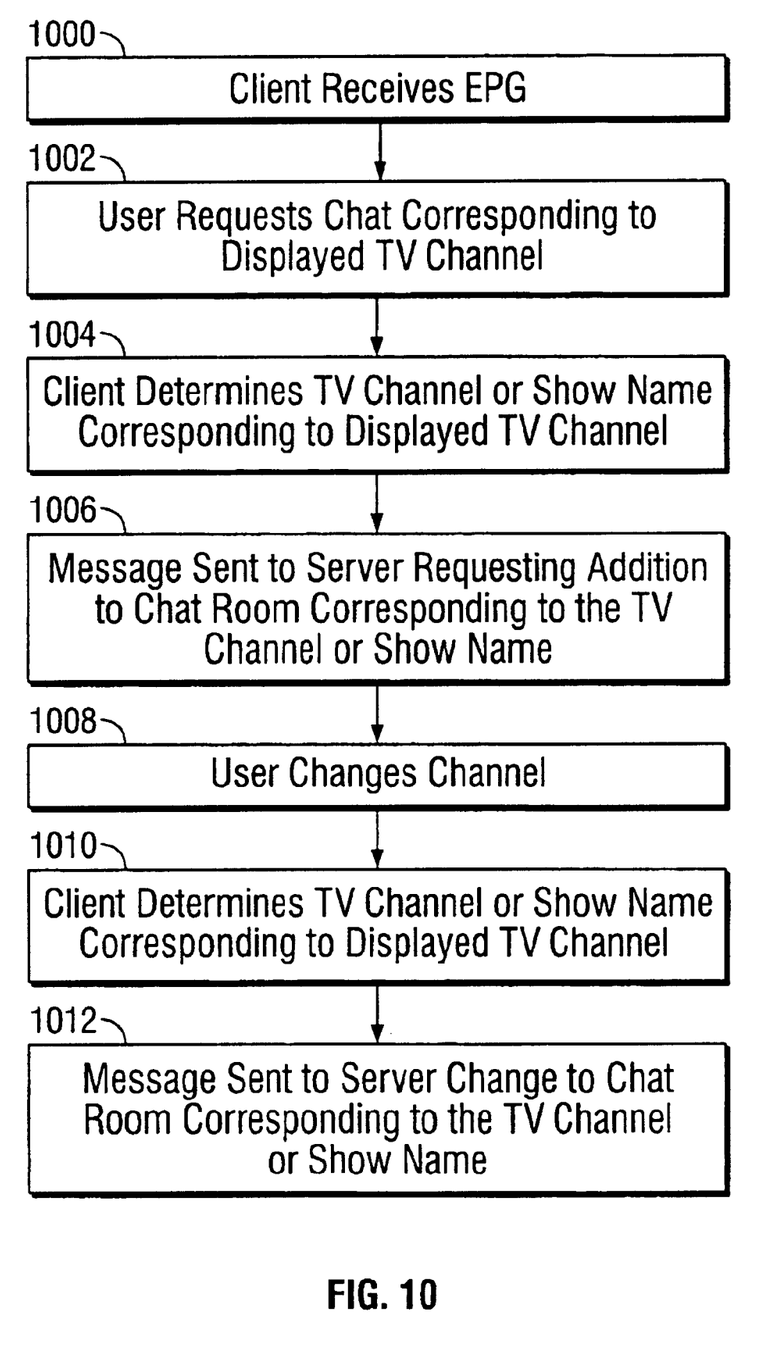
FIG. 10 is a flow chart of a process for assigning a user to a chat room based on the set-top box tuner.

FIG. 10 shows a process for automatically assigning users to a chat room based on the TV show a viewer is currently watching. Like the processing of links described above, the chat room assignment process can use information in the EPG 1000 to determine the television programming a user is viewing. When a user selects a TV chat button or other user interface control 1002, the process determines the currently tuned channel (e.g., channel "38"). The process then uses the EPG to identify the show corresponding to this channel 1004. For example, the process can use an EPG to lookup the TV show being broadcast on channel "38" at the current time. After identifying the TV show 1006, the set-top box can transmit a request to join a chat for the identified TV show 1006. The message may include the name of the TV show, the channel number, the network or other information the server can use to determine which show the viewer is watching. The server can then place the user in the chat room associated with that TV show.

As described, each time the user changes channels 1008, the set-top box can transmit a message to the server 1010, 1012 indicating the new channel the viewer is watching. If the user is already in a TV chat room, the server can move the user to chat room corresponding to the new channel. For example, if the user tunes from "Love Boat" to "Fantasy Island", the user can be moved from the Love Boat chat room to the Fantasy Island chat room. The client may wait a short period of time before transmitting a "Channel Changed" message to see if the user changes channel again quickly. This reduces the number of messages produced when a viewer "channel surfs" for an interesting program.

Buddy List

Figure 11:
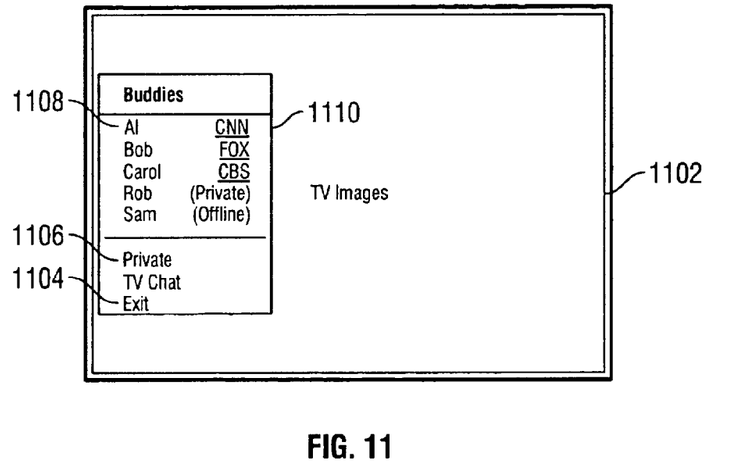
FIG. 11 shows a screen display of a buddy list showing TV shows that users are watching.

FIG. 11 shows a set-top box display that includes a TV program 1102 and a TV-enhanced buddy list 1110. Like conventional buddy lists, a user can define a list of server system user names. In addition to showing whether users on the list are currently logged on to the server, the enhanced buddy-list shows the TV show or network 1110 each listed buddy 1108 is watching. As shown, the TV show and/or network 1110 can be displayed as a link. By selecting the link, a user can watch the same show that a friend is watching.

Figure 12A:
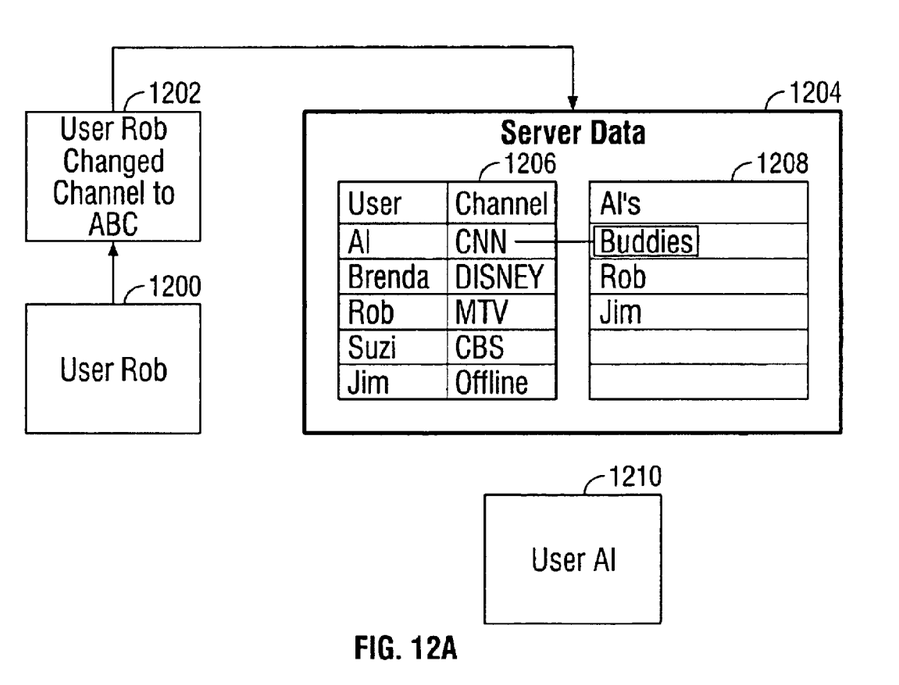
FIGS. 12A–12B are flow diagrams illustrating transmission of information to users on a buddy list.
Figure 12B:
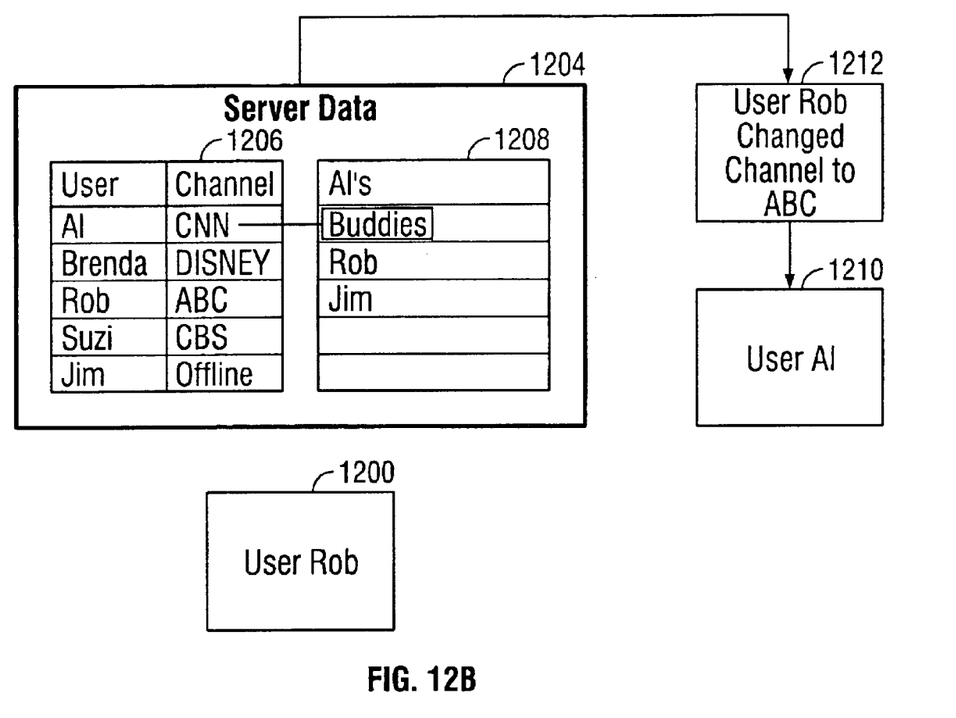

FIGS. 12A and 12B shows server data 1204 used to provide the enhanced buddy list functions. The data 1204 includes a list 1206 of logged-in users and the TV show and/or network that each user is currently watching. The server also stores a buddy list 1208 for each user. The buddy list 1208 may be permanently stored on the server 1204 or transmitted to the server 1204 by a set-top box when a user logs-on. As shown in FIG. 12A, when a user 1200 changes channels, set-top box software transmits a message 1202 to the server including the name of the show and/or the network the user is presently viewing. As shown in FIG. 12B, the server 1204 updates the user list 1206 to reflect the new viewing information. The server also transmits a message 1212 to each logged-in user 1210 that included the channel-changing user in his or her list.

Figure 13:
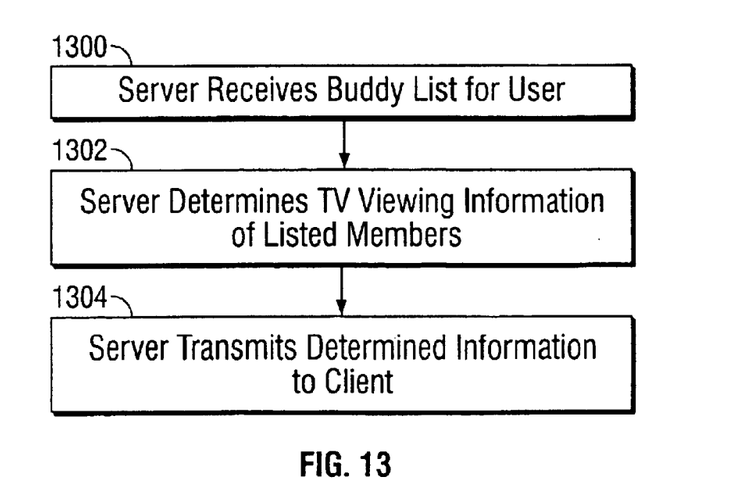
FIG. 13 is a flow chart of a process for receiving viewing information relating to users on a buddy list.

FIG. 13 shows a process for providing buddy lists that display the show or network a user is viewing. After a user logs-on, the set-top box software transmits the user's buddy list 1300 to the server. The server responds by sending the set-top box TV viewing information for each member of the user's buddy list 1302, 1304. The transmitted information, however, will quickly be outdated as members of the buddy list log-on and off, change channels, or turn on a "privacy" feature that stops the server from broadcasting the TV show they are watching.

Figure 14:
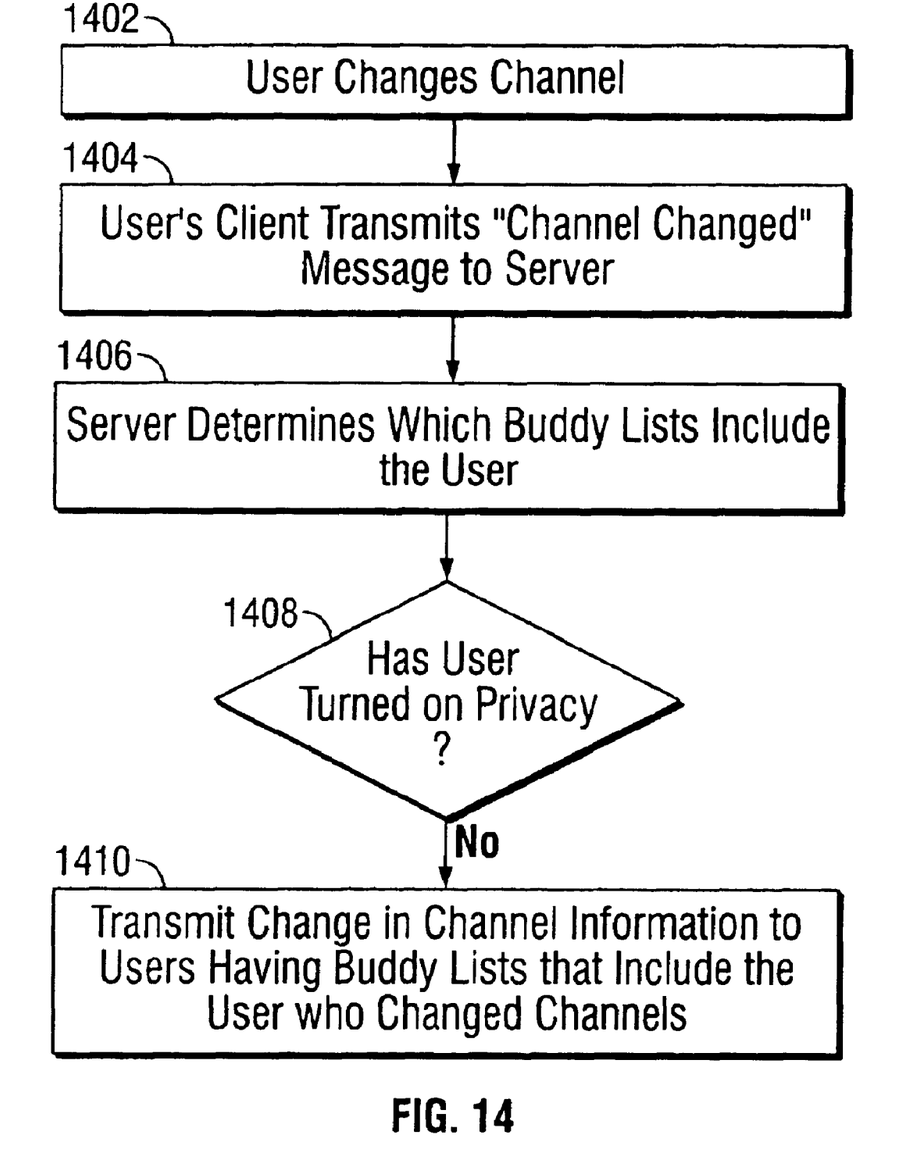
FIG. 14 is a flow chart of a process for updating buddy list viewing information.

FIG. 14 shows a process for updating the buddy list information initially transmitted. As each user changes channels 1402, the user's set-top box transmits a message to the server describing the change 1404. The server uses these messages to update its user list 1406. After updating 1404, the server broadcasts 1410 the change to each logged-on user who included the channel changing user in their buddy list. Viewers can turn off this feature if they do not want others to see the name of the TV show they are watching.

A network user may have more than one buddy list. For example, the user may specify other users for a general buddy list, a buddy list for a particular network, and/or a buddy list for a particular television show or sports team. The server may provide chat rooms for members of a user's buddy list. For example, a user may click a "buddy chat" button on a graphical user interface and be assigned to a chat room for the buddies on the list. The graphical user interface may display different buddy lists for user selection based on the show being viewed. For example, when a user tunes to "I Love Lucy", the user's "I Love Lucy" buddies will appear with an option for a buddy chat for those users.

The techniques, methods and systems described here may find applicability in any computing or processing environment in which electronic content may be viewed, accessed or otherwise manipulated. Implementations may vary considerably. For example, in some embodiment, EPGs for each TV source are stored centrally at the server instead of being distributed to each set-top box. In this embodiment, the EPG lookup functions are handled by messages exchanged by the server and clients. In general, tasks process may be distributed between client and server in a variety of ways.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method of informing a first network user of activity by other network users, the method comprising:

selecting based on input from the first network user two or more of the other network users;

determining television programming being viewed by at least a first selected network user and a second selected network user;

displaying a user list corresponding to the selected network users on an instant messaging user interface;

displaying a first visual identifier for television programming being viewed by the first selected network user, the first visual identifier being displayed at a location of the instant messaging user interface that is adjacent to a location of the user list corresponding to the first selected network user;

displaying a second visual identifier for the television programming being viewed by the second selected network user, the second visual identifier being displayed at a location of the instant messaging user interface that is adjacent to a location of the user list corresponding to the second selected network user;

receiving information indicating a change in the television programming viewed by at least one of the first and second selected network users; and updating an appearance of at least one of the first and second visual identifiers to reflect the change in television programming, wherein the first visual identifier differs from the second visual identifier.

2. The method of claim 1 wherein determining the television programming comprises receiving information identifying the television programming via the Internet.

3. The method of claim 2 wherein receiving the information via the Internet comprises receiving the information at a set-top box.

4. The method of claim 1 further comprising transmitting a message requesting information identifying the television programming from a server.

5. The method of claim 1 further comprising receiving information identifying the television programming without sending a requesting message.

6. The method of claim 1 wherein displaying visual identifiers comprises displaying a link that upon selection, automatically tunes the user interface to television programming identified by the link.

7. The method of claim 1, wherein displaying the user list further comprises displaying identifiers associated with the selected network users.

8. The method of claim 1, wherein displaying the user list comprises displaying a buddy list.

9. The method of claim 1 wherein the first visual identifier comprises a television program being viewed by the first selected user.

10. The method of claim 9 further comprising presenting to the first network user television programming differing from television programming corresponding to the first visual identifier.

11. The method of claim 1 wherein the first visual identifier comprises a network being viewed by the first selected user.

12. The method of claim 1 wherein the television programming being viewed by the first selected user differs from the television programming being viewed by the second selected user.

13. A computer program disposed on a computer readable medium, for informing a first network user of activity by other network users, the computer program including instructions for causing a processor to:

select by the first network user two or more of the other network users;

determine television programming being viewed by at least a first selected network and a second selected network user;

display a user list corresponding to the selected network users on an instant messaging user interface;

display a first visual identifier for television programming being viewed by the first selected network user, the first visual identifier being displayed at a location of the instant messaging user interface that is adjacent to a location of the user list corresponding to the first selected network user;

display a second visual identifier for the television programming being viewed by the second selected network user, the second visual identifier being displayed at a location of the instant messaging user interface that is adjacent to a location of the user list corresponding to the second selected network user;

receive information indicating a change in the television programming viewed by at least one of the first and second selected network users; and update an appearance of at least one of the first and second visual identifiers to reflect the change in television programming, wherein the first visual identifier differs from the second visual identifier.

14. The computer program of claim 13 wherein the instructions to determine comprise instructions to receive information identifying the television programming via the Internet.

15. The computer program of claim 14 wherein the instructions to receive the information via the Internet comprise instructions to receive the information at a set-top box.

16. The computer program of claim 13 wherein the instructions that display the visual identifiers comprise instructions that display a link that upon selection, automatically tunes a tuner to the television programming identified by the link.

17. The computer program of claim 13 wherein the first visual identifier comprises a television program being viewed by the first selected user.

18. The computer program of claim 13 wherein the first visual identifier comprises a network being viewed by the first selected user.

19. The computer program of claim 13 wherein the television programming being viewed by the first selected user differs from the television programming being viewed by the second selected user.

20. A method for informing a first network user of activity by other network users, the method comprising:

determining television programming being viewed by at least a first selected network user and a second selected network user;

providing an instant messaging user interface, the instant messaging user interface comprising:

a list of two or more network users selected by the first network user, the list showing presence information for at least the first selected network user and the second selected network user; and distinct visual identifiers respectively displayed in positions adjacent various of the selected network users on the user list, including:

a first visual identifier for television programming being viewed by the first selected network user, the first visual identifier being displayed at a location of the instant messaging user interface that is adjacent to a location of the user list corresponding to the first selected network user; and a second visual identifier for television programming being viewed by the second selected network user, the second visual identifier being displayed at a location of the instant messaging user interface that is adjacent to a location of the user list corresponding to the second selected network user, wherein the first visual identifier differs from the second visual identifier;

receiving information indicating a change in the television programming viewed by at least one of the first and second selected network users; and updating an appearance of at least one of the first and second visual identifiers to reflect the change in television programming.

21. The method of claim 20 wherein the first visual identifier comprises a television program being viewed by the first selected user.

22. The method of claim 20 wherein the first visual identifier comprises a network being viewed by the first selected user.

23. The method of claim 20 wherein the television programming being viewed by the first selected user differs from the television programming being viewed by the second selected user.

24. A method of informing a first network user of activity by other network users, the method comprising:
- selecting based on input from the first network user two or more of the other network users;
- determining television programming being viewed by at least a first selected network user and a second selected network user;
- displaying a user list corresponding to the selected network users on an instant messaging user interface;
- displaying distinct visual identifiers respectively in positions adjacent various of the selected network users on the displayed user list, including:
  - displaying a first visual identifier for television programming being viewed by the first selected network user, the first visual identifier being displayed at a location of the instant messaging user interface that is adjacent to a location of the user list corresponding to the first selected network user; and
  - displaying a second visual identifier for the television programming being viewed by the second selected network user, the second visual identifier being displayed at a location of the instant messaging user interface that is adjacent to a location of the user list corresponding to the second selected network user, wherein the first visual identifier differs from the second visual identifier;
- receiving information indicating a change in the television programming viewed by at least one of the first and second selected network users; and
- updating an appearance of at least one of the first and second visual identifiers to reflect the change in television programming.

25. A computer program disposed on a computer readable medium, for informing a first network user of activity by other network users, the computer program including instructions for causing a processor to:
- select by the first network user two or more of the other network users;
- determine television programming being viewed by at least a first selected network and a second selected network user;
- display a user list corresponding to the selected network users on an instant messaging user interface; and
- display distinct visual identifiers respectively in positions adjacent various of the selected network users on the displayed user list, including instructions for causing the processor to:
  - display a first visual identifier for television programming being viewed by the first selected network user, the first visual identifier being displayed at a location of the instant messaging user interface that is adjacent to a location of the user list corresponding to the first selected network user; and
  - display a second visual identifier for the television programming being viewed by the second selected network user, the second visual identifier being displayed at a location of the instant messaging user interface that is adjacent to a location of the user list corresponding to the second selected network user, wherein the first visual identifier differs from the second visual identifier;
- receive information indicating a change in the television programming viewed by at least one of the first and second selected network users; and
- update an appearance of at least one of the first and second visual identifiers to reflect the change in television programming.

* * * * *